Patented Oct. 14, 1924.

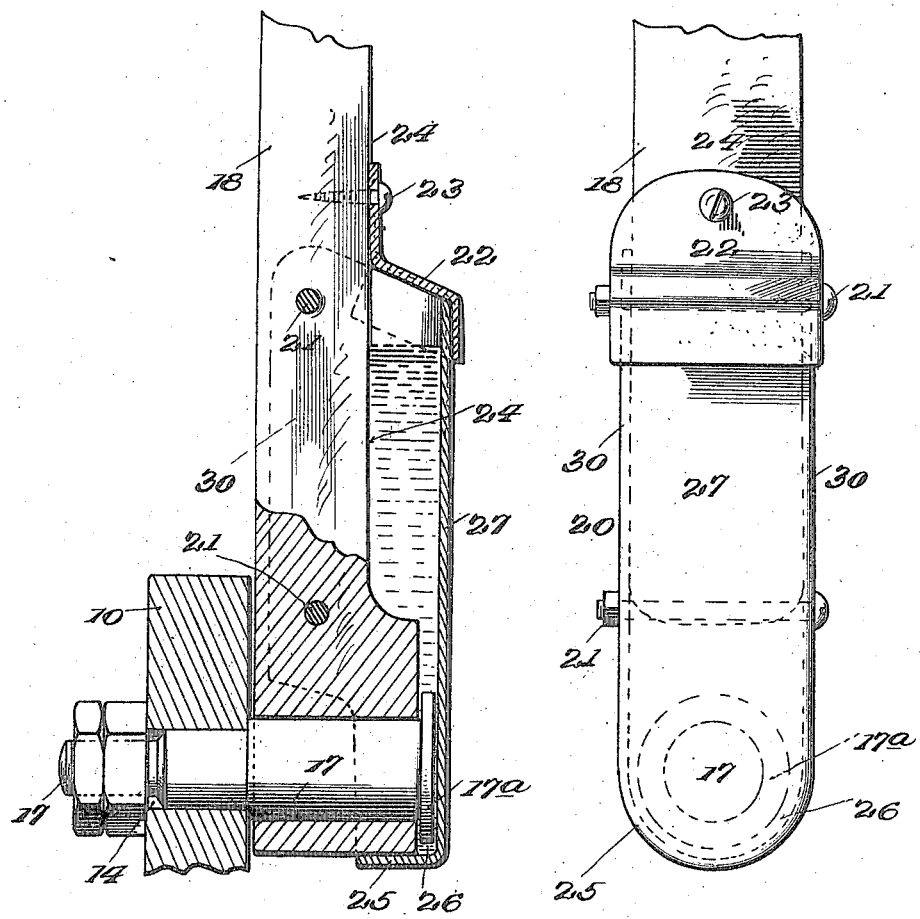

1,511,862

UNITED STATES PATENT OFFICE.

RODNEY H. YALE, OF LINCOLN, NEBRASKA, ASSIGNOR TO YALE AND HOPEWELL COMPANY, OF LINCOLN, NEBRASKA, A CORPORATION OF NEBRASKA.

LUBRICATING WRIST PINS AND THE LIKE.

Original application filed February 13, 1920, Serial No. 358,386. Divided and this application filed August 21, 1920. Serial No. 405,064.

*To all whom it may concern:*

Be it known that I, RODNEY H. YALE, a citizen of the United States of America, and resident of Lincoln, Lancaster County, State of Nebraska, have invented certain new and useful Improvements in and Relating to Lubricating Wrist Pins and the like, of which the following is a specification (a division of my application S. No. 358,386, filed Feb. 13, 1920, for lubricators).

This invention relates to certain improvements in and relating to lubricating wrist pins and the like, and particularly to lubricating windmill wrist pins; and the objects and nature of the invention will be readily understood by those skilled in the art in the light of the following explanation of the accompanying drawings illustrating what I now believe to be the preferred embodiment or mechanical expression of my invention from among other forms, constructions and arrangements within the spirit and scope thereof.

It is an object of the present invention to provide for the lubrication of wrist pins by the provision of means adapted to hold or contain a large body or mass of grease which will supply lubricant to the bearing surface of the pin for a considerable length of time without the necessity of recharging, filling or inspecting the same.

It is a further object of the invention to provide for the lubrication of wrist pins by means of a large body or mass of grease held against a portion of the bearing surface to be lubricated, which body is automatically fed thereto by gravity assisted by atmospheric pressure to supply only such quantity to the bearing as will sufficiently lubricate it and prevent overflow of used gritty, grease back to the main body or mass.

It is a further object of the invention to provide means for lubricating the wrist pins of windmills by the use of a grease container of considerable capacity which is attached to the crank or pitman in which the pin is journaled and from which position the grease will be supplied to the bearing surfaces of pin and crank in sufficient quantities to lubricate the same.

It is a further object of the invention to provide means for lubricating windmill wrist pins which consists of a grease container of simple construction and low cost attached to the pitman in which the pin is journaled, in such a manner, that a side of the pitman forms a side of the container whereby great economy of material and space and simplicity of construction and arrangement is secured in the complete operative assembly.

With the above and other objects in view, the invention consists in certain novel features of construction and in combinations and arrangements as more fully and particularly set forth and specified hereinafter.

Referring to the accompanying drawings:—

Fig. 2 is a vertical longitudinal section through a lubricator of my invention attached to a wrist pin and pitman.

Fig. 3 is a side elevation of a lubricator embodying my invention applied to a wrist pin and pitman, parts of the assembly being shown in dotted lines.

Figure 1:
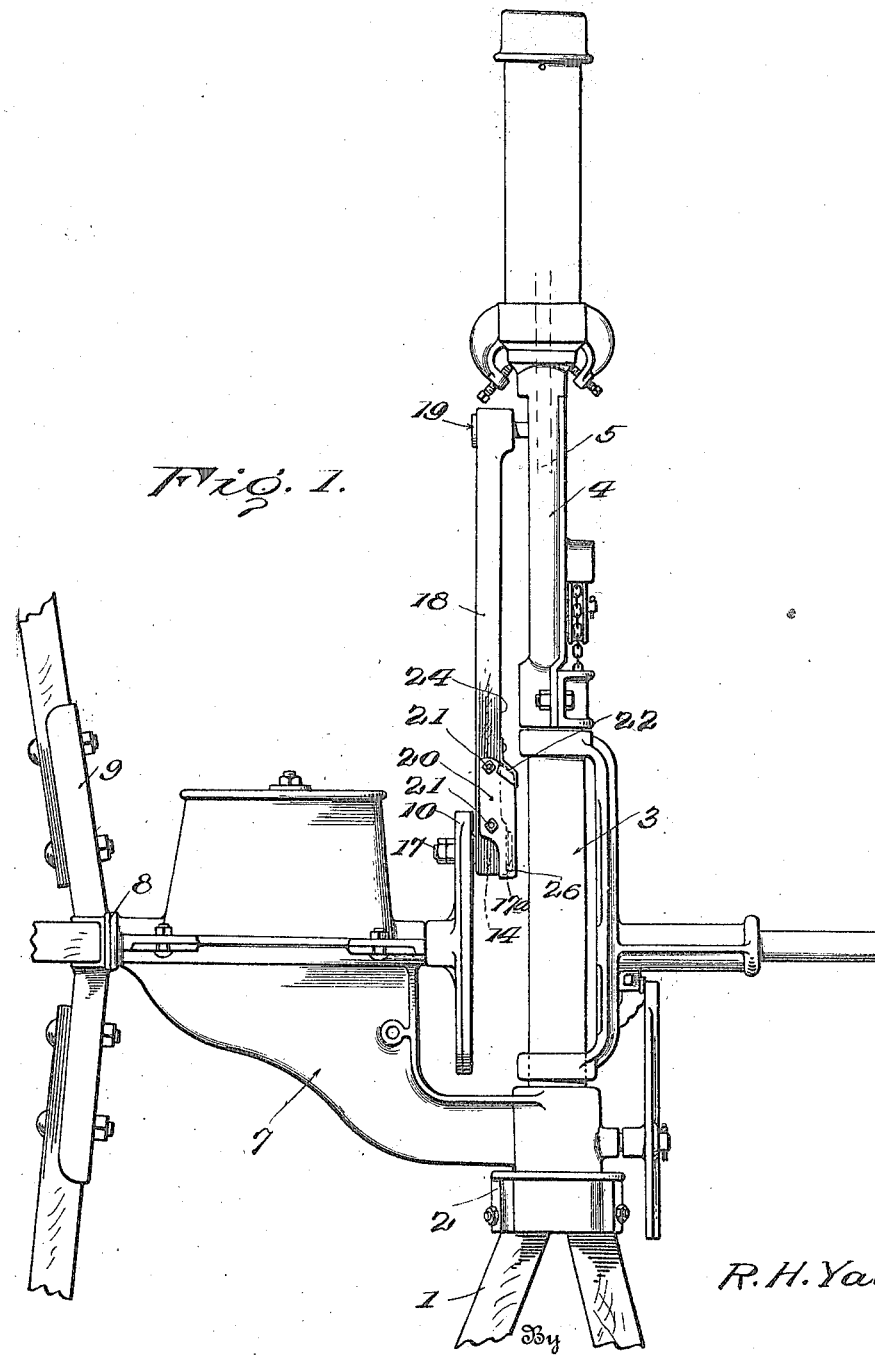
Fig. 1 is an elevation showing in part a windmill head equipped with a lubricator embodying my invention.

In the accompanying drawings, I show a lubricator embodying my invention applied to the wrist pin of a windmill, but I do not desire to limit my invention to windmill wrist pins or to the specific embodiment shown and described herein, as it is apparent that my invention is applicable to wrist pin and pitman bearings generally, and is possible of other embodiments without departing from the spirit and scope of the invention.

In the particular example illustrated, I show a more or less conventional form and construction of the upper part of a windmill well known to those skilled in the art. A suitable supporting frame or tower 1 carries the usual base 2 on which the windmill head is mounted. The construction of the windmill head provides a bracket 7 upon which a wheel or drive shaft 8 is suitably mounted. A casing 3 extends vertically upward from the head 2 and at its upper end is provided with the slide or guideway 4 in alinement therewith and in continuation thereof. The usual pump or piston rod 5 extends through casing 3 and into the slide or guideway 4 when it is slidably mounted in and guided by the guideway 4.

The outwardly extending end of the shaft 8 is provided with the wheel 9 and the inner projecting end of this shaft has the crank disk 10 mounted thereon and rotated thereby. A wrist pin 17 is carried by disk 10 and is journaled in the lower end of a pitman 18. The upper end of pitman 18 receives a stud shaft or wrist pin 19 fixed to and projecting laterally from the pitman bar or piston rod 5, in the open side of the guideway 4. The rod 5 is hence reciprocated vertically, sliding in guideway 4, by the rotation of the driving shaft 8 and its crank disk 10 by wheel 9.

In the particular example illustrated, the wrist pin 17 is mounted in a bearing hole 14 that extends transversely through the end portion of the pitman and the free end of said pin projects outwardly beyond the opposite side face of the pitman from the crank disk and is provided with an enlarged end head 17$^a$ extending outwardly beyond said face of the pitman.

My invention provides for the automatic lubrication of this wrist pin bearing in the pitman. A narrow vertically elongated grease box 20 is applied to the face of the pitman beyond which the wrist pin projects and the box is so arranged that the projecting wrist pin end is located within the lower end of the box and approximately sustains and upholds the mass of lubricant within the box and rotates in the bottom of the mass of grease. The movement of the wrist pin in the lubricant and the relative movement of the pin and pitman will feed and carry lubricant into the bearing to lubricate the same without such excessive feed as will cause objectionable dripping from the open end of the bearing adjacent the crank disk face. It will be noted that the lubricant box is interiorly unobstructed for the free downward settling of the mass of grease therein, and also that the box receives one end only of the wrist pin so that fresh lubricant is constantly supplied without reuse of worn out or gritty lubricant.

In the example shown, the lubricant box 20 is formed by a vertically elongated metal box open at one side and the top and fitted on the pitman to snugly fit the side and end edges thereof, and secured by bolts 21 through the side walls 30 of the box. The outer wall of the lubricant box is formed by the closed side 27 of the metal box while the inner wall of the lubricant box is formed by the side face 24 of the pitman.

The lower end 25 of the lubricant box forms a bottom pocket 26 that is approximately occupied by the wrist pin end so that said end is located in the lubricant and the lubricant is constantly held down thereto by its own weight and is, in effect, sustained thereby.

The open upper end of the box is normally closed by a removable cover plate 22 normally secured by removable screw 23. This cover is arranged to exclude rain and snow but permit inflow of air to maintain atmospheric pressure in the box above the body of grease. The capacity of this box is sufficient to receive a large mass of cup or other grease of the desired viscosity to function as hereinbefore described without adjustment or attention for a considerable period of time.

The weight of the mass or body of grease in the box 25 with the atmospheric pressure exerted through the top of the box, under and around cover 22, upon the upper portion of the body of grease is sufficient to force the lower portion of the body to and around the enlarged head 17$^a$ of the wrist pin 17, and through the rotation of the pin in the lower portion of the body of grease sufficient grease will be fed into the bearing and onto the pin to properly lubricate the same for a long period of time.

Desiring to protect my invention in the broadest manner legally possible, what I claim is:—

1. In combination, a horizontal shaft having an end crank and outwardly extending wrist pin, a pitman having a bearing hole extending transversely through its end portion, said pin extending through said hole, and an upright gravity feed grease supply box enclosing the outer end of said bearing hole only and fastened to and supported on said pitman, whereby the body of thick or heavy grease in the box rests on said pin by gravity to constantly supply fresh grease to said bearing without reuse of worn out or gritty grease discharged from the bearing.

2. In combination, a horizontal shaft having an end crank and outwardly extending wrist pin, a pitman having a bearing hole extending transversely through its end portion, said pin journaled in said bearing hole and having its free end extending beyond said pitman, and a grease supply box enclosing the outer end only of said pitman and extending to the free end of said pin, said box being interiorly formed for the free downward movement of grease against said pin by gravity.

3. In combination, a horizontal shaft having an end crank and outwardly extending wrist pin, a pitman having a bearing hole extending transversely through its end portion, said pin journaled in and extending through said hole with its free end projecting outwardly beyond the same, and an upright gravity feed grease supply box fitting said pitman, said grease box enclosing the outer end of said bearing hole and said projecting free end of said pin and so arranged that said pin will work in the lower portion of the mass of grease in said box, said box being interiorly formed for the free downward movement of the grease against said pin by gravity, to supply heavy grease to the bearing without reuse of lubricant discharged from the bearing.

4. In combination, a horizontal shaft having an end crank and outwardly extending wrist pin, a pitman having a bearing hole extending transversely through its end portion, said pin extending through said hole with its free end projecting outwardly beyond the same, and an upright gravity-feed grease supply box fitting said pitman, said box being normally covered but open for air passage above the heavy grease in the box, said grease box enclosing the outer end only of said bearing hole and said projecting free end of said pin and so arranged that said pin will work in the lower portion of the mass of grease in said box, said box being interiorly formed for the free downward movement of the grease against said pin by gravity, the side face of the pitman forming the inner wall of said box, said box having side flanges fitting the longitudinal and end edges of the pitman.

5. A lubricator for a wrist pin and pitman connection consisting of a grease box open at one side for attachment to a pitman by its edge walls whereby a side face of the pitman forms the inner wall of the box and the lower end of said box provides a pocket enclosing an end of the wrist pin and pin bearing, whereby the heavy grease settles by gravity on the pin to supply the bearing without reuse of worn grease discharged from the bearing.

6. In combination, a shaft having a crank provided with a wrist pin, a pitman in which said pin is journaled, and an upright gravity-feed container for hard oil or grease, said container open to said pin to feed grease to the bearings therefor by gravity, said container being carried by said pitman, whereby the body of grease settles by gravity onto the pin to supply the bearing without reuse of worn grease discharged from the bearing.

7. In combination, a shaft having an end crank and outwardly extending wrist pin, a pitman having a bearing hole receiving said pin, and an upright gravity feed grease supply box fitting said pitman, said grease box open to said pin and so arranged that said pin will work in the lower portion of the mass of grease in said box, said box being interiorly formed for the free downward movement of the grease against said pin by gravity and against reuse of worn grease discharged from said bearing, said body of heavy grease resting against said pin to supply said bearing.

8. In combination, a shaft having an end crank and outwardly extending wrist pin, a pitman having a transverse bearing hole, said pin journaled in said bearing hole, and a grease supply box secured to the outer end of said pitman and open to said pin, said box being interiorly formed for the free downward movement of grease against said pin by gravity and to prevent reuse of worn grease discharged from said bearing.

9. In combination, a pitman having a bearing, a wrist pin journaled in said bearing, and an upright grease box of large capacity open to said pin and bearing and constructed and arranged to require the body of heavy grease to rest against said pin and settle down thereon by gravity as the bearing is supplied without reuse of worn grease discharged from said bearing, said box being open for passage of air above the body of grease and having an open top and a removable cover.

10. In combination, a pitman having a bearing, a wrist pin journaled in said bearing, and an upright grease box of large capacity open to said pin and bearing and constructed and arranged to require the body of heavy grease to rest against said pin and settle down thereon by gravity as the bearing is supplied without reuse of worn grease discharged from said bearing, said box being open for passage of air above the body of grease and having an open top and a removable cover, said box being open to fit over the pitman and having side flanges to fit the edges of the pitman and be secured thereto.

11. In combination, a pitman having a bearing, a wrist pin journaled in said bearing, and an upright grease box of large capacity open to said pin and bearing and constructed and arranged to require the body of heavy grease to rest against said pin and settle down thereon by gravity as the bearing is supplied without reuse of worn grease discharged from said bearing, said box being open for passage of air above the body of grease and having an open top and a removable cover, said box being open at the side to receive the pitman which thereby forms one side wall of the grease chamber, the side and bottom walls of the box tightly fitting the side and end edges of the pitman.

RODNEY H. YALE.